United States Patent [19]

Miller

[11] 4,340,956

[45] Jul. 20, 1982

[54] MINIMUM TRACKING FORCE STYLUS

[75] Inventor: Michael E. Miller, Indianapolis, Ind.

[73] Assignee: RCA Corporation, New York, N.Y.

[21] Appl. No.: 138,882

[22] Filed: Apr. 10, 1980

[51] Int. Cl.$^3$ ............................................. G11B 3/10
[52] U.S. Cl. .............................. 369/244; 358/128.6; 369/251
[58] Field of Search ............... 369/244, 251, 253, 254, 369/256, 249; 358/128.5, 128.6; 178/6.6 R

[56] References Cited

U.S. PATENT DOCUMENTS

| | | |
|---|---|---|
| 2,478,223 | 8/1949 | Argabrite . |
| 3,247,404 | 4/1966 | Batsch ................................... 310/86 |
| 3,744,802 | 7/1973 | Bowerman ...................... 369/244 X |
| 3,787,616 | 1/1974 | Falk et al. ............................ 358/128 |
| 3,830,505 | 8/1974 | Rabinow ......................... 369/251 X |
| 3,963,861 | 6/1976 | Crooks ............................. 358/128.5 |
| 3,993,863 | 11/1976 | Leedom .......................... 358/128.5 |
| 4,138,121 | 2/1979 | Nakajima et al. ............... 369/251 X |
| 4,152,727 | 5/1979 | Tatsuguchi et al. ......... 358/128.6 X |
| 4,162,511 | 7/1979 | Toda et al. .......................... 358/128 |
| 4,164,756 | 8/1979 | Toda et al. .......................... 358/128 |
| 4,173,348 | 11/1979 | Dholakia ............................. 358/128 |
| 4,176,378 | 11/1979 | Toda et al. .......................... 358/128 |

FOREIGN PATENT DOCUMENTS 1469483 4/1977 United Kingdom .
1533842 11/1978 United Kingdom .
2013957 8/1979 United Kingdom .

OTHER PUBLICATIONS

"Piezoelectric Transducer Materials", by Jaffe et al., Proceedings of IEEE, vol. 53, #10, Oct. 1965, pp. 1372–1386.
"Piezo Films & Tiny Silicon–Based Relays Promise Innovative Actuator Designs", EDN, Nov. 20, 1979, pp. 111–116.

Primary Examiner—Harry N. Haroian
Attorney, Agent, or Firm—E. M. Whitacre; J. S. Tripoli; E. P. Herrmann

[57] ABSTRACT

In a video disc player of the type having a signal pickup stylus engaging a disc record for recovering prerecorded information signals, an electromechanical transducer is arranged to cooperate with the signal pickup stylus to regulate the bearing pressure between the stylus and the disc in response to the signal strength of the recovered signal. The arrangement tends to extend the life of the stylus.

4 Claims, 4 Drawing Figures

MINIMUM TRACKING FORCE STYLUS

This invention relates to video disc player systems and in particular to the stylus arm assembly in those systems employing a signal pickup stylus which engages the disc record.

In more sophisticated disc record systems for reproducing audio and video information, the density of recorded information on the disc record is extremely high. To realize the high information density the information is recorded as geometric variations in concentric or spiral tracks having a high track density, e.g., 6,000–10,000 tracks per inch. A consequence of the high track density is a narrow track width and a concomitantly small signal pickup stylus. It is easily appreciated that the smaller the stylus the more susceptible it will be to wear and the harder the constituent material must be, e.g., diamond.

Typically the stylus is urged mechanically against the disc by a compression spring to provide a nominal pressure which will guarantee a nominal signal strength over a wide range of disc conditions. As a result, the stylus-disc bearing pressure exceeds that pressure which is necessary to produce an acceptable signal strength during a substantial percentage of play time. This condition induces unnecessary stylus wear.

In accordance with the present invention the stylus-disc bearing pressure is adjusted to increase stylus life or alternatively to permit the use of a less hard and less expensive stylus material. The stylus arm for holding the signal pickup stylus arm is integrally equipped with a transducer-servo system for adjusting the stylus-disc bearing pressure responsive to the time average of the signal strength of the signal recovered by virtue of the stylus-disc interaction.

Figure 1:
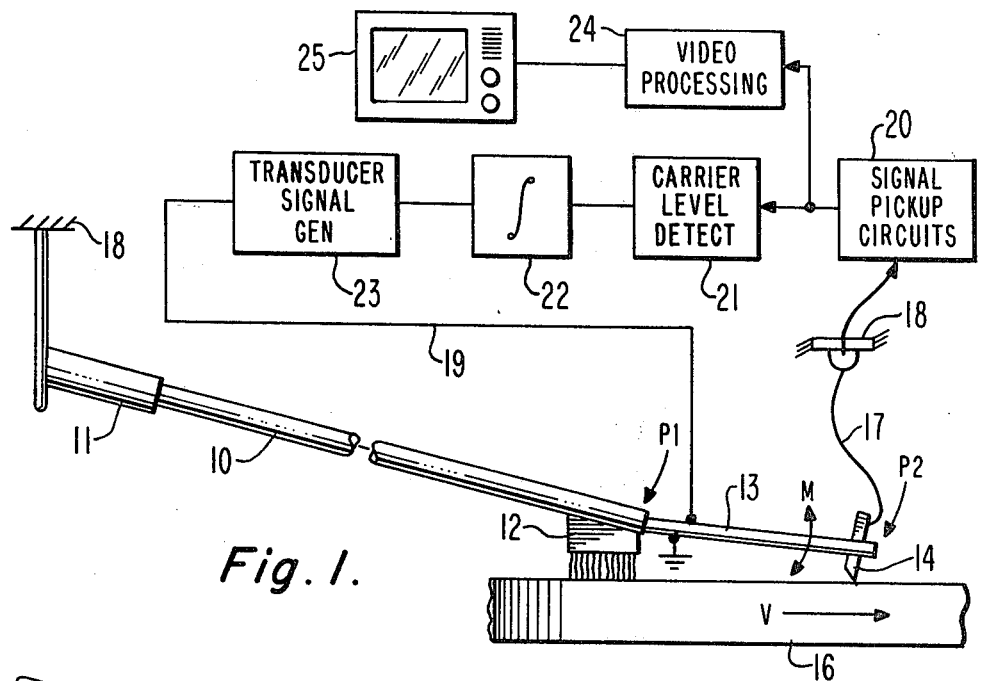
FIG. 1 is a partial schematic, partial block diagram of a video disc stylus-stylus arm assembly and electronics embodying the present invention.

Referring to FIG. 1, a signal pickup stylus 14 is shown engaging a disc record 16 with the relative velocity therebetween shown by the arrow designated "V". The signal pickup stylus is secured to a composite member comprising an electromechanical transducer 13 and a generally rigid stylus arm 10. A load bearing member 12 is secured to the stylus arm and slidably rides on a surface of disc 16 to partially support the weight of the composite member. The stylus arm 10 is coupled via a compliant coupler 11 to a carriage mechanism 18 (partially shown) for translating the stylus-stylus arm assembly in a direction radially across the disc record, i.e., in the direction into or out of the drawing. Electrical connection between the signal pickup stylus 14 and preprocessing pickup circuitry 20 is afforded by the wire filament 17. The preprocessing pickup circuitry cooperates with the signal pickup stylus to retrieve the recorded information from the disc. Signals from the pickup circuitry 20 are applied to video processing circuitry 24 where the signal is conditioned and formatted for application to the antenna terminals of a conventional television receiver 25.

The transducer 13 is of the type which produces a bending moment (depicted "M" in the drawing) between its ends responsive to an applied potential. An example of such a transducer is a multilayer piezoelectric crystal. One end of the transducer is fixedly secured to stylus arm 10 at point P1. The other end, P2, carries the signal pickup stylus and is substantially free to move. Application of a potential to the transducer 13, via line 19, causes point P2 to bend in a generally vertical direction about point P1. If the point P2 bends vertically upward less of the total weight of the composite arm is supported by the signal pickup stylus and more by the load bearing member 12. Conversely if point P2 is caused to bend downward more of the weight is borne by the signal pickup stylus and less by the load bearing member. In this manner the signal pickup stylus-disc bearing pressure can be dynamically adjusted.

In both the pressure sensitive and capacitive type stylus video disc systems, the signal strength is related to the stylus-disc interaction pressure. Therefore one can use the signal strength as a control parameter for adjusting the stylus pressure to achieve the desired signal strength. Note that in the pressure sensitive pickup systems not only signal strength but also frequency response is affected by stylus pressure, thus frequency response may also be a source of transducer control.

Consider a system in which the recorded information is in frequency modulated (FM) format. Ideally the amplitude of an FM signal is constant especially where the transmission medium is a hard wired circuit. The stylus-disc interface is substantially the only system parameter in the information recovery circuitry subject to changes which can appreciably affect the amplitude of the FM signal. For example, accumulation of foreign matter on the stylus may cause an increase in the stylus-disc separation reducing the capacitance therebetween. The amplitude (strength) of the FM signal is an indication of the stylus-disc interface conditions and therefore can provide a dynamic stimulus to apply corrective measures, e.g., changing stylus-disc bearing pressure.

Referring again to FIG. 1 the FM signal is available from circuit 20 and is applied to detector circuit 21 which detects the amplitude of the FM signal to produce an amplitude modulated signal proportional to the FM signal strength. The amplitude modulated signal is integrated or averaged by circuitry 22 to set a limit on the frequency response of the transducer system. The integrated signal, $V_S$, is applied to the transducer signal generator 23 which generates a bipolarity control signal which is applied via line 19 to the transducer 13. Signal generator 23 compares the integrated signal, $V_S$, with a reference level, $V_R$, and produces an output signal of a first polarity ($\pm$) proportional to $(V_S-V_R)$ for $V_S$ greater than $V_R$, and an output signal of a second polarity ($\mp$) proportional to $(V_R-V_S)$ for $V_S$ less than $V_R$. The amount of pressure regulation between stylus and disc is proportional to the signal deviation from the reference, and the reference is typically set in accordance with the recovered signal strength or level being near the minimum acceptable level to preclude stylus wear.

Electromechanical transducers of the piezoelectric type typically have two control electrodes for applying control signals thereto. These electrodes are located on the outer surfaces of opposite sides of the crystal structure and are easily accessible. To achieve bidirectional motion a constant potential is applied to one of the electrodes and a control potential which varies about this constant potential is applied to the other electrode. Further, the signal potential appearing on the pickup stylus may be at a frequency substantially above the bending frequency response of the transducer. In this event the control signal may be superimposed on the recovered signal and applied to one electrode of the transducer by means of the stylus signal pickup lead 17 and an electrical interconnection between the signal pickup stylus 14 and the transducer electrode. Where the stylus arm 10 is made of conductive material, the second transducer electrode may be connected to the stylus arm and then accessed at the most convenient location.

The physical length of the transducer between points P1 and P2 is limited by the bending response of the system and the anticipated warpage of the disc. This distance must be short enough so that when the stylus rides over an elevated region of the record the stylus will not be disengaged from the record before the transducer system can respond. The load bearing element 12 should be arranged so that a downward bending of the transducer will produce the maximum stylus pressure desired. In the arrangement shown this may require adding some mass to the stylus arm 10 or applying downward pressure on stylus arm 10 by means of a leaf spring for example.

The load bearing element 12 is comprised of a material which will slidably bear on the record without damage to the disc and bear a portion of the weight of the composite arm assembly. Element 12 may be a fabric having protruding bristles or fibers such as a velvet pad, e.g., "Politex Supreme" by GeoScience Instrument Co., Stamford, Conn. or it may be a simple plastic block. The fiber type material will, however, contribute to improving the recovered signal by virtue of partially cleaning the record and if the diameter of the fibers are narrower than the disc groove width (or if the fibers have projections narrower than the groove width) so as to engage the grooves, then the element 12 will aid the signal pickup stylus in tracking the disc groove. Further, if the element 12 exhibits a resiliance in the vertical direction, then a load shift between the signal pickup stylus and the load bearing element by virtue of a controlled bending of the transducer will permit a broader range of pressure control.

Figure 2:
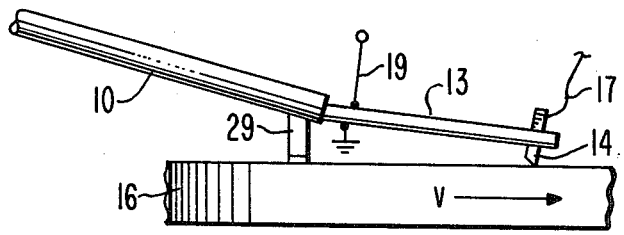
FIGS. 2 and 3 are schematic diagrams of variations on the stylus arm and transducer assembly which is depicted in FIG. 1.

An alternative load bearing element 29 in FIG. 2 is in the form of an auxiliary stylus. Typically the auxiliary load bearing stylus would have an elongated bearing surface, i.e., in a direction along the record groove to preclude excessive wear due to its bearing the weight of the stylus arm. Since the auxiliary stylus does engage and track a groove and partially cleans the groove in so doing, it is advantageous to arrange the auxiliary stylus to track a groove ahead of the signal pickup stylus. In contrast to such auxiliary stylus tracking a single groove, element 29 may be a stylus having a bearing surface contoured to engage and track a plurality of groove convolutions. This stylus would also provide preplay record cleaning and tracking aid and have sufficient stylus-disc bearing area to preclude excessive pressure being applied to a small area of the disc and thereby rapid wear of the load bearing stylus.

Figure 3:
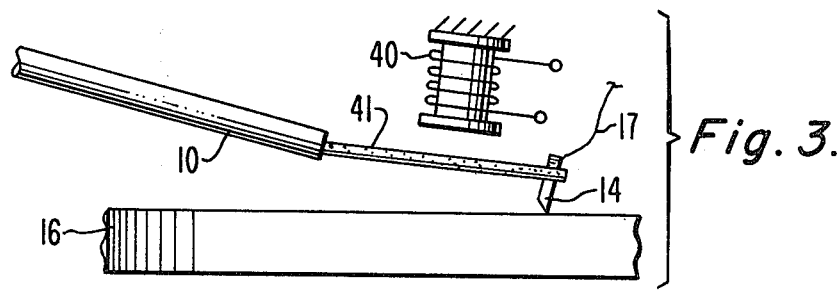

FIG. 3 illustrates a stylus arm-transducer servo system wherein the electromechanical transducer comprises an electromagnet 40 secured to the carriage and arranged proximate a portion of the stylus arm assembly 41 which constitutes a magnetic material or which is impregnated with a magnetic material. In this arrangement a current is applied to the electromagnet to create a magnetic field which produces a vertical force on magnetic element 41 to reduce or increase the percentage of the load which is carried by the signal pickup stylus. This arrangement obviates the need for the load bearing element and requires no additional electrical connections to the composite stylus arm. If, however, the magnetic element has a high degree of compliance in the vertical direction, i.e., normal to the record surface, inclusion of a load bearing element such as 12 or 29 may be appropriate.

Figure 4:
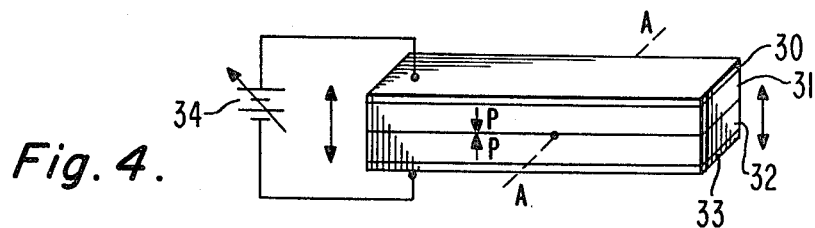
FIG. 4 is a schematic illustration of a piezoelectric transducer.

FIG. 4 shows one configuration of a multi-layer piezoelectric transducer suitable for use in the present stylus arm servo system. In the figure, numerals 31 and 32 denote piezoelectric crystals (e.g., lead titanate-zirconate, PZT) or piezoelectric polymer films (e.g., polyvinylidene fluoride) and numerals 30 and 33 represent conductive electrodes. The crystals (films) are arranged to have their polarization vectors in opposite directions. A potential applied via source 34 to opposite electrodes 30 and 33 produces an electric field in the crystals 31 and 32 in a direction parallel to the crystal polarization vectors P. The crystal having its polarization vector in the same direction as the electric field expands in the longitudinal direction while the crystal having its polarization vector opposite the electric field contracts in the longitudinal direction. The result is a bending of the ends of the composite crystal about an axis A—A central to the structure similar to the bending of a bimetallic strip subject to thermal changes. If one end of the structure is secured, the opposite end will bend in a predictable relation to the secured end to permit accurate control of the position of the free end.

What is claimed is:

1. In a record playback apparatus, of the type wherein information prerecorded in FM or phase angle modulated signal format is recovered from a record medium by means of a signal pickup apparatus engaging the record medium, said signal pickup apparatus being mounted to an arm which is compliantly suspended from a carriage mechanism, the improvement comprising:

first means connected to the signal pickup apparatus for generating a first signal having an amplitude related to the amplitude of the recovered FM signal;

second means responsive to said first signal for producing a control signal;

piezoelectric transducer means responsive to said control signal and coupled between said arm and said signal pickup apparatus for controlling the pressure applied between the signal pickup apparatus and the record medium responsive to the amplitude of the FM signal recovered therefrom.

2. In a video disc player of the type having a signal pickup stylus engaging a record disc for recovering information prerecorded in FM format thereon, said stylus being secured proximate a first end of a stylus arm, the second end of which is compliantly coupled to a carriage mechanism for translating the signal pickup stylus in a direction radially across the disc, apparatus for regulating the force occurring between the record disc and said stylus comprising:

first circuit means responsive to said recovered FM information signals for generating a further signal proportional to the average amplitude of the recovered FM signal over a prescribed period;

second circuit means responsive to said further signal for generating a control signal, said control signal having a first polarity when the amplitude of the further signal exceeds the amplitude of a prescribed reference signal and having a second polarity when the amplitude of the further signal is less than the amplitude of said reference signal;

a longitudinal piezoelectric bending transducer mounted between the first end of the stylus arm and the signal pickup stylus aligned generally coaxial with the stylus arm and oriented to impart a translation to the signal pickup stylus in a direction normal to the disc record responsive to said control signal; and load bearing means secured to the stylus arm between said transducer and said carriage mechanism and bearing slidably on the disc for supporting a portion of the weight of the stylus arm determined by the bending forces generated in said transducer.

3. The apparatus set forth in claim 2 wherein the load bearing means comprises a further stylus having a disc bearing surface substantially larger than the disc bearing surface of the signal pickup stylus.

4. The apparatus set forth in claim 2 wherein the load bearing means comprises a pad having a plurality of projecting bristles.

* * * * *